United States Patent [19]

Lardellier

[11] Patent Number: 4,765,135

[45] Date of Patent: Aug. 23, 1988

[54] GAS TURBINE ENGINE

[75] Inventor: Alain, M. J. Lardellier, Melun, France

[73] Assignee: Societe Nationale d'Etude et de Construction de Moteurs d'Aviation "S.N.E.C.M.A.", Paris, France

[21] Appl. No.: 113,918

[22] Filed: Oct. 29, 1987

[30] Foreign Application Priority Data

Oct. 29, 1986 [FR] France ................. 86 15035

[51] Int. Cl.$^4$ .............................. F02K 3/072
[52] U.S. Cl. ................. 60/226.2; 60/39.162; 60/268
[58] Field of Search ........... 60/226.1, 226.2, 39.162, 60/268, 39.161, 262, 228, 229

[56] References Cited

U.S. PATENT DOCUMENTS

| | | | |
|---|---|---|---|
| 2,428,330 | 9/1947 | Heppner | 60/268 |
| 2,430,399 | 11/1947 | Heppner | |
| 2,454,738 | 11/1948 | Hawthorne | 60/268 |
| 2,504,181 | 4/1950 | Constant | 60/226.1 |
| 2,519,130 | 8/1950 | Griffith | 60/226.1 |
| 2,546,420 | 3/1951 | Barr | |
| 2,704,434 | 3/1955 | Schmitt | 60/39.161 |
| 3,131,536 | 5/1964 | Snell | |
| 3,253,406 | 5/1966 | Grieb | 60/226.1 |
| 3,818,695 | 6/1974 | Rylewski | 60/268 |

FOREIGN PATENT DOCUMENTS

| | | |
|---|---|---|
| 2535394 | 5/1984 | France |
| 2560642 | 9/1985 | France |
| 585342 | 2/1947 | United Kingdom |
| 1084184 | 9/1967 | United Kingdom |
| 1319849 | 6/1973 | United Kingdom |
| 2129502 | 5/1984 | United Kingdom ............ 60/39.162 |

OTHER PUBLICATIONS

*Aviation Week & Space Tech.*, "CFM56-5 Thrust Reverser for A320 Undergoes Tests", 10-20-86, p. 68.

*Primary Examiner*—Donald E. Stout
*Attorney, Agent, or Firm*—Oblon, Fisher, Spivak, McClelland & Maier

[57] ABSTRACT

A gas turbine engine for an aircraft comprises a gas generator which includes a compressor stage, a combustion chamber, and a turbine for driving the compressor, and through which the air and combustion gases flow from the rear towards the front in relation to the direction of travel of the aircraft before undergoing a reversal of direction to feed two contra-rotating power turbines which directly drive two contra-rotating airscrew or fan stages located near the front of the engine in the same longitudinal region as the power turbines. The gas generator is supplied by an air intake consisting of a plurality of ducts disposed around the outer casing of the engine, and the gases exiting from the power turbines are exhausted through a plurality of ducts positioned between the inlet ducts.

8 Claims, 2 Drawing Sheets

GAS TURBINE ENGINE

BACKGROUND OF THE INVENTION

1. Field of the Invention

The invention relates to a gas turbine engine intended for aircraft propulsion, of the type comprising a gas generator which supplies two interdigitated, contra-rotating, low-speed, power turbines.

2. Summary of the Prior Art

No. FR-A-2 535 394 describes a gas turbine engine of this type in which the power turbines are disposed downstream of the gas generator and are driven directly by the hot gases emerging from the generator. The turbines, directly and without any reduction gearing, drive either two contra-rotating airscrew stages, or two streamlined fan stages, which provide propulsion. Two installation solutions are proposed. One envisages disposing the airscrews or the fans at the rear of the engine, which presents problems and difficulties in the case of fitment under the wings of an aircraft. The other envisages disposing them at the front of the engine which, in order to provide a drive, requires the use of connecting shafts, the location of which likewise presents problems.

FR-A-2 560 642 describes a gas turbine engine of the same type in which a contra-rotating supercharging compressor is associated with contra-rotating forward-mounted fans. Means for regulating the pitch of the blades of a fan stage is incorporated and permits flow reversal to be obtained.

SUMMARY OF THE INVENTION

The invention sets out to provide a gas turbine engine of the type indicated which makes it possible to avoid the drawbacks of the known solutions.

To this end, according to the invention there is provided, in a gas turbine engine intended for aircraft propulsion and having front and rear ends defined in relation to the direction of travel of the aircraft propelled by said engine, an engine casing, air intake means including of a plurality of inlet ducts arranged around said engine casing, means defining an annular chamber disposed to receive said intake air from said inlet ducts, a gas generator disposed to receive said intake air from said annular chamber and comprising compression stages, a combustion chamber, and turbine stages for driving said compression stages, said annular chamber being located to the rear of said gas generator and said generator being arranged such that said air from said chamber travels in a forward direction successively through said compression stages, said conbustion chamber, and said turbine stages of said gas generator, a forwardly extending axial outlet duct from said gas generator, two interdigitated contra-rotating, low-speed, power turbines adapted to be driven by hot gases from said gas generator and disposed in a radially superposed relationship outwards of said axial outlet duct, means connected to said axial outlet duct for receiving said gases from said gas generator and reversing the direction of flow thereof to feed said gases in a rearward direction through said power turbines, and ejection means for said gases exiting from said power turbines, wherein the interior disposition of said engine, from front to rear, comprises in succession:

said interdigitated contra-rotating power turbines and said axial outlet duct from said gas generator in partial radial superposition;
said turbine stages of said gas generator;
said combustion chamber;
said compression stages of said gas generator, and
said annular air inlet chamber.

In a first embodiment of the gas turbine engine in accordance with the invention, the contra-rotating power turbines are arranged to drive two contra-rotating airscrew stages disposed in the same longitudinal region as the power turbines, the engine thus constituting a forward airscrew turbo-prop unit of the type referred to as a "tractor prop-fan" unit.

Preferably the ejection means comprises an outlet passage from the power turbines, and a multiplicity of exhaust ducts for conducting the gases from the outlet passage to the outside of the engine casing, the exhaust ducts being arranged around the said casing and interposed between the air inlet ducts.

In a second embodiment of the gas turbine engine in accordance with the invention, the contra-rotating power turbines are arranged to drive two streamlined fan stages placed at the same longitudinal region, the engine thus constituting a forward turbo-fan of the type referred to as an "upstream contra-fan" unit.

Further characteristic features and advantages of the invention will become apparent from the ensuing description of preferred embodiments with reference to the accompanying drawings.

DESCRIPTION OF THE PREFERRED EMBODIMENTS

Figure 1:
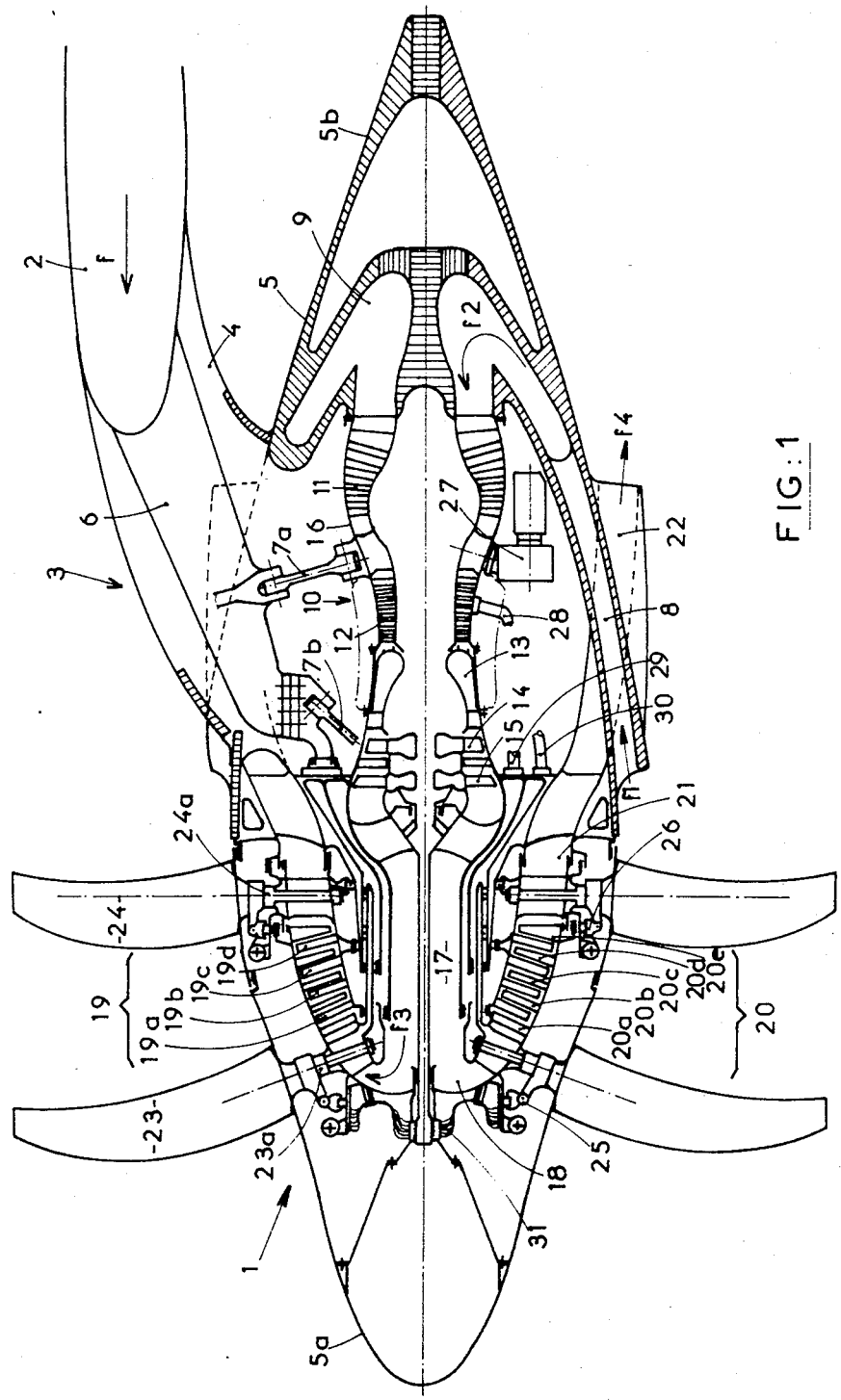
FIG. 1 is a longitudinal axial sectional view showing diagrammatically one embodiment of a gas turbine engine in accordance with the invention of the forward turbo-prop type; and, FIG. 2 is a similar longitudinal axial sectional view, but showing diagrammatically two embodiments of a gas turbine engine in accordance with the invention of the forward turbo-fan type, one embodiment being shown in the upper half of the drawing and the other embodiment being shown in the lower half.

In FIG. 1 the gas turbine engine 1 of the forward turbo-prop type is shown connected to the wing 2 of an aircraft by a pylon-mast 3, which comprises a structure 4 rigid with the outer casing 5 of the engine and which further comprises a support pylon 6 to which are fixed supporting links 7a and 7b. The outer casing 5 of the engine comprises a front portion 5a and a rear portion 5b of generally conical aerodynamically profiled shape. The terms front and rear are defined in relation to the direction of travel of the propelled aircraft as indicated by the arrow f on the aircraft wing part 2. Circumferentially spaced around the outer casing 5 of the engine are a plurality of passages 8 forming an air inlet sleeve and opening into a first annular settlement chamber 9. In the passages 8 the air flows from front to rear, and from the chamber 9 the air undergoes a first reversal of its direction of travel in order to flow forwards to enter a gas generator 10 comprising elements which are known and conventional but which are disposed in succession in a manner peculiar to the present invention.

Progressing from the rear to the front, the gas generator comprises a low pressure multi-stage axial compressor 11, then a high pressure multi-stage axial compressor 12 from which the compressed air passes into an annular combustion chamber 13 which feeds hot gases to turbines driving the compressors, respectively at high pressure 14 and at low pressure 15. The gas generator 10 which is thus constituted is supported by and connected to the support pylon 6 by the supporting links 7a and 7b, which are fixed to the outer casing 16 of the gas generator in the region of the compressor casing, thus affording the advantage of locating the fixing points in a cold zone.

The gas generator 10 is extended forwards by an axial gas outlet duct 17 which conveys the gases to a second annular chamber 18 in which the gases undergo a second reversal of their direction of travel so that they then flow rearwards to enter power turbine stages disposed radially outwards of the duct 17. The power turbines comprise a first turbine rotor 19 having a plurality of blade stages 19a, 19b, 19c, 19d of which the roots are secured together radially inwardly, and a second turbine rotor 20 having a plurality of blade stages 20a, 20b, 20c, 20d and 20e of which the roots are secured together radially outwardly, the stages of the two turbine rotors 19 and 20 being interdigitated.

To the rear of the power turbines 19,20 an annular gas outlet duct 21 is connected to a plurality of passages 22 which discharge outside the outer casing 5 of the engine, the passages 22 being arranged around the casing in positions between the air inlet passages 8. The arrows f1, f2, f3 and f4 represent the flow of the gases in the engine, indicating respectively the air intake, the intake at the gas generator, the intake at the power turbines, and the ejection, and f2 and f3 further representing the two reversals in the direction of flow.

In the region of the power turbines 19 and 20 and outside the casing 5 of the engine there are the blades 23 and 24 of two longitudinally spaced airscrew stages. The roots 23a of the blades 23 constituting the forward airscrew stage are secured to the turbine structure 20, while the roots 24a of the blades 24 constituting the rear airscrew stage are secured to the structure of the turbine 19. The turbine rotors 19 and 20 are contra-rotating, and therefore drive the airscrews 23 and 24 likewise in a contra-rotating manner. Attached to each airscrew stage 23 and 24 is a device 25 and 26 respectively, which controls the variable pitch and the reversal of pitch of the airscrews, and complementary arrangements have also been illustrated.

Outside the casing 16 of the gas generator and on the lower side there is an accessory casing 27 comprising a power take-off. Cooling of the engine bearings is provided by bleeding air from the high pressure compressor 11, through a tube 28, which is connected (by connections, not shown) to tubes 29 and 30. An oil distributor 31 makes it possible to supply the oil needed to control the pitch of the upstream turbine rotor.

Figure 2:
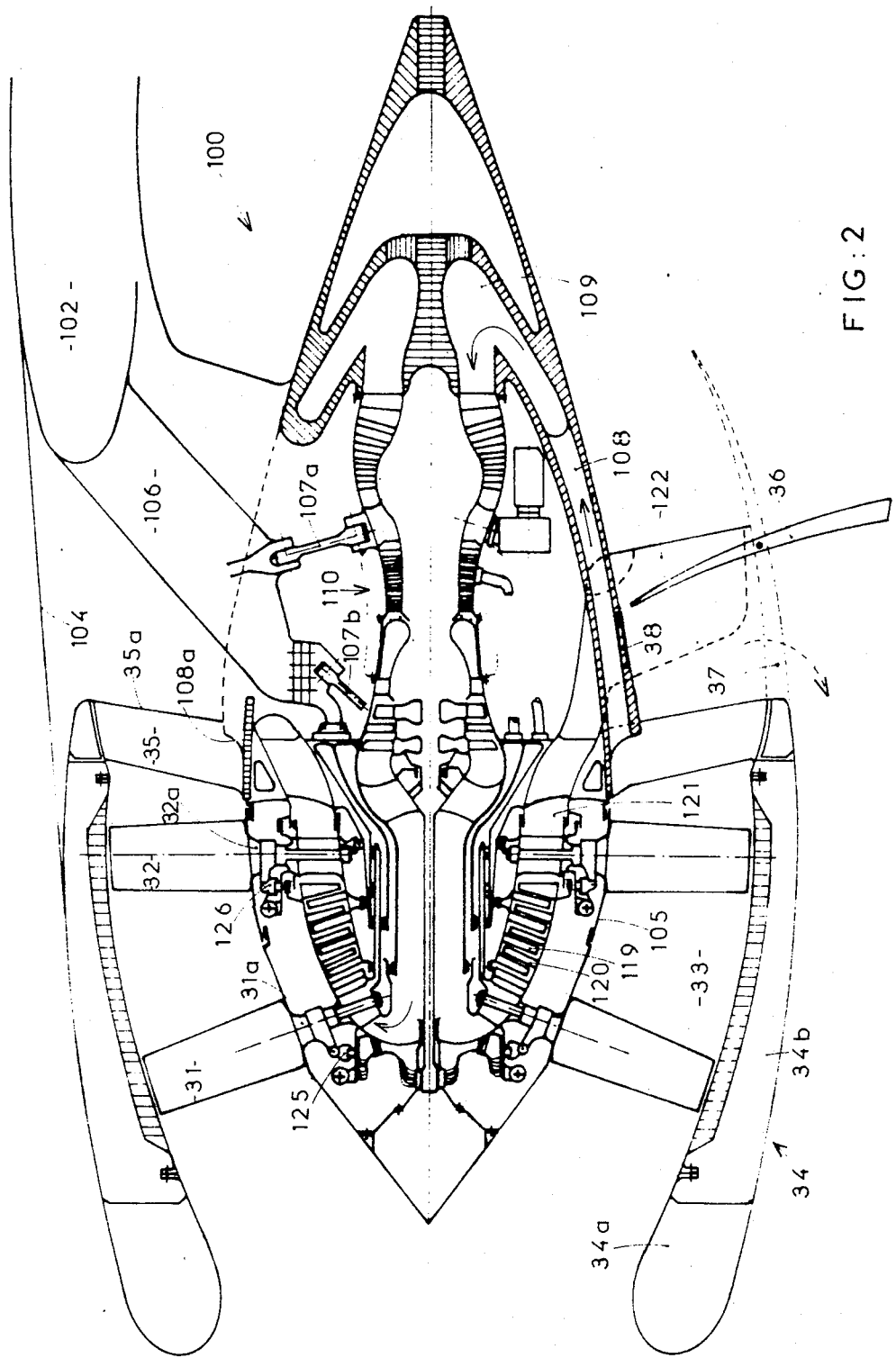

Further embodiments of a gas turbine engine in accordance with the invention, which are of the forward turbo-fan type, are shown in FIG. 2. Those elements which are identical to those in the embodiment shown in FIG. 1 have been retained in FIG. 2, but with references obtained by adding 100 to the numbering used for them in FIG. 1. Connection of the gas turbine engine 100 to the structure of the aircraft is by the identical structure of a support pylon 106 and supporting links 107a and 107b. The gas generator 110 is likewise identical, as are the two interdigitated and contra-rotating power turbines 119 and 120. On the other hand, in place of the two airscrews 23 and 24, two fan stages 31 and 32 are provided, although the connections of the roots 31a and 32a of the fan blades to the turbine structures 119 and 120 are the same. Consequently, the two fan stages 31 and 32 are likewise contra-rotating.

From the air intake via the passages 108, the inlet into the gas generator 110 from the chamber 109, and as far as the annular outlet duct 121 from the power turbines 119 and 120, the gas circuit in the engine is identical to that in the previous embodiment described with reference to FIG. 1. In the embodiments of FIG. 2, however, the outlet jacket 105 of the engine now constitutes the inside wall of an annular fan duct 33, the outer wall of which consists of an outer fan duct jacket 34 comprising an upstream inlet 34a and a central portion 34b. This fan duct casing 34 is supported by aerodynamically profiled arms 35 which extend radially through the fan duct 33 downstream of the rotating fan stages 31 and 32 and which connect it to the casing 105 of the engine. As in the previous embodiment, the roots 31a and 32a of the fan blades can be connected to means 125 and 126 for controlling the variable pitch.

The upper half of FIG. 2 shows a half axial sectional view of one embodiment of a turbo-fan engine in accordance with the invention, in which the fan duct casing 34 is extended on the downstream side by an aerodynamic connecting structure 104 to the supporting part 102 of the aircraft. In this case, at the exit from the outlet duct 121 of the power turbines 119 and 120, the heated gases are directed into the interior of the arms 35 and are exhausted from their trailing edges 35a downstream of the air inlets at the front end 108a of the passages 108.

The lower half of FIG. 2 represents a half-axial section of an alternative embodiment of a turbo-fan engine in accordance with the invention, comprising a system for reverse thrust by reversal of the secondary flow in the fan duct 33. In this case, beyond the arms 35, the casing 34 of the fan duct is extended on the downstream side by an annular ring of pivotal flaps 36 which are capable of pivoting so that they can shut off towards the rear, the downstream part of the duct 33, and open up lateral ejection passages 37.

The intake of air into the inlet ducts 108 may be augmented by providing lateral apertures 38 in the walls of the ducts. Also, the outlet duct 121 from the power turbines may be extended rearwardly so that outlet orifices 122 positioned between the inlet ducts 108 communicate with the downstream part of the fan duct 33 beyond the aerodynamically profiled arms 35.

In addition to the already noted advantages which are provided by the invention, particularly that of simplification by doing away with any reduction gearing and by facilitating fitment of the engine on the aircraft by disposing the airscrews or fans at the forward end without this requiring longitudinal transmission by long and radially superimposed shafts, the gas circuit principle comprising a double reversal of the direction of flow provides the following further advantages:

improved protection of the gas generator against taking in sundry objects, particularly birds, since the air inlets to the compressors are protected; and the avoidance of slipstream problems which arise with rear airscrew constructions.

What is claimed is:

1. In a gas turbine engine intended for aircraft propulsion and having front and rear ends defined in relation to the direction of travel of the aircraft propelled by said engine, an engine casing, air intake means including a plurality of inlet ducts arranged around said engine casing, means defining an annular chamber disposed to receive said intake air from said inlet ducts, a gas generator disposed to receive said intake air from said annular chamber and comprising compression stages, a combustion chamber, and turbine stages for driving said compression stages, said annular chamber being located to the rear of said gas generator and said generator being arranged such that said air from said chamber travels in a forward direction successively through said compression stages, said combustion chamber, and said turbine stages of said gas generator, a forwardly extending axial outlet duct from said gas generator, two interdigitated, contra-rotating, low-speed power turbines adapted to be driven by hot gases from said gas generator and disposed in a radially superposed relationship outwards of said axial outlet duct, means connected to said axial outlet duct for receiving said gases from said gas generator and reversing the direction of flow thereof to feed said gases in a rearward direction through said power turbines, and ejection means for said gases exiting from said power turbines, wherein the interior disposition of said engine, from front to rear, comprises in succession:

said interdigital, contra-rotating, power turbines and said axial outlet duct from said gas generator in radial superposition;

said turbine stages of said gas generator;

said combustion chamber;

said compression stages of said gas generator, and said annular air inlet chamber.

2. A gas turbine engine according to claim 1, wherein two contra-rotating airscrew stages are connected to said contra-rotating power turbines to be driven thereby, said airscrew stages being disposed in the same longitudinal region as said power turbines whereby the said engine constitutes a forward airscrew turbo-prop unit of the type referred to as a "tractor propfan" unit.

3. A gas turbine engine according to claim 2, wherein said ejection means comprises an outlet passage from said power turbines and a plurality of exhaust ducts connected to said outlet passage for conducting gases therefrom to the outside of said engine casing, said exhaust ducts being disposed around said engine casing in positions between said air inlet ducts.

4. A gas turbine engine according to claim 1, wherein two fan stages are connected to said contra-rotating power turbines to be driven thereby, said fan stages being disposed in the same longitudinal region as said power turbines, and said engine includes an outer fan duct casing, and aerodynamically profiled arms fixed to said engine casing and supporting said outer fan duct casing in radially spaced relation around said engine casing to define an annular duct within which said fan stages are disposed, the engine thus constituting a forward turbo-fan unit of the type referred to as an "upstream contra-fan" unit.

5. A gas turbine engine according to claim 4, wherein said ejection means comprises an outlet duct from said power turbines, leakage trailing edges of said aerodynamically profiled arms, and means connecting said outlet duct to said leakage edges, said leakage edges being located downstream of the front ends of said air inlet ducts.

6. A gas turbine engine according to claim 4, wherein an annular ring of flaps extends rearwardly from said outer casing of said fan duct beyond said aerodynamically profiled arms, said flaps being adapted to pivot in order to occlude said fan duct at the rear and to open lateral gas ejection passages for reversing the thrust flow.

7. A gas turbine engine according to claim 6, wherein said ejection means comprises an outlet duct from said power turbines and outlet orifices connected to said outlet duct and extending through the engine casing at positions between said air inlet ducts.

8. A gas turbine engine according to claim 6, wherein said air inlet ducts comprise additional inlet apertures.

* * * * *

UNITED STATES PATENT AND TRADEMARK OFFICE
CERTIFICATE OF CORRECTION

PATENT NO. : 4,765,135
DATED      : AUGUST 23, 1988
INVENTOR(S): ALAIN M. J. LARDELLIER

It is certified that error appears in the above-identified patent and that said Letters Patent is hereby corrected as shown below:

Title page:

IN THE ABSTRACT: line 3, after "turbine" insert --stage--.

Signed and Sealed this

Twenty-seventh Day of June, 1989

Attest:

DONALD J. QUIGG

Attesting Officer

Commissioner of Patents and Trademarks